United States Patent [19]

Antoine

[11] Patent Number: 5,354,533
[45] Date of Patent: Oct. 11, 1994

[54] METHOD FOR THE HOT DEFORMATION OF A WORK PIECE

[75] Inventor: Jean-Claude Antoine, Sainte-Adresse, France

[73] Assignee: La Tolerie Plastique, Octeville-Sur-Mer, France

[21] Appl. No.: 984,511

[22] Filed: Dec. 2, 1992

[51] Int. Cl.$^5$ .............................................. B29C 53/00
[52] U.S. Cl. ................................... 264/296; 264/322; 264/339
[58] Field of Search ............... 264/239, 320, 322, 339, 264/294, 295, 296, 522, 40.1, 327; 65/102, 106; 72/342.94, 369, 379.2

[56] References Cited

U.S. PATENT DOCUMENTS

| | | | |
|---|---|---|---|
| 4,002,417 | 1/1977 | Vecchiotti et al. | 264/296 |
| 4,465,453 | 8/1984 | Turner et al. | 264/322 |
| 4,601,689 | 7/1986 | Finkle et al. | 264/339 |
| 4,744,846 | 5/1988 | Pflug et al. | 156/212 |
| 4,759,815 | 7/1988 | Frey | 264/322 |
| 4,818,460 | 4/1989 | Nied | 264/320 |
| 5,066,351 | 11/1991 | Knoll | 264/322 |

FOREIGN PATENT DOCUMENTS

| | | |
|---|---|---|
| 0365054 | 4/1990 | European Pat. Off. |
| 3034283 | 4/1982 | Fed. Rep. of Germany |
| 898095 | 6/1962 | United Kingdom |

OTHER PUBLICATIONS

Plastverarbeiter, 1979, Nr. 1, "Variationsmöglichkeiten beim Abkanten und örtlichen Biegen von thermoplastischem Plattenmaterial" * no translation provided.

*Primary Examiner*—Jan H. Silbaugh
*Assistant Examiner*—Christopher A. Fiorilla
*Attorney, Agent, or Firm*—Renner, Kenner, Greive, Bobak, Taylor & Weber

[57] ABSTRACT

To achieve the hot deformation of a work piece (2), for example by folding a piece of plastics material, the method includes exerting on the work piece (2), in the zone (2a) to be deformed, a controlled deforming pressure (P1) and, during at least the initial stage of the application of this pressure, heating the work piece in a controlled manner, at least in the zone (2a) to be deformed, whereby, under the combined effect of the pressure and the heat, the work piece is deformed into the desired final state when it has reached a temperature in relation to the mechanical deformation stress to which it is subjected.

16 Claims, 1 Drawing Sheet

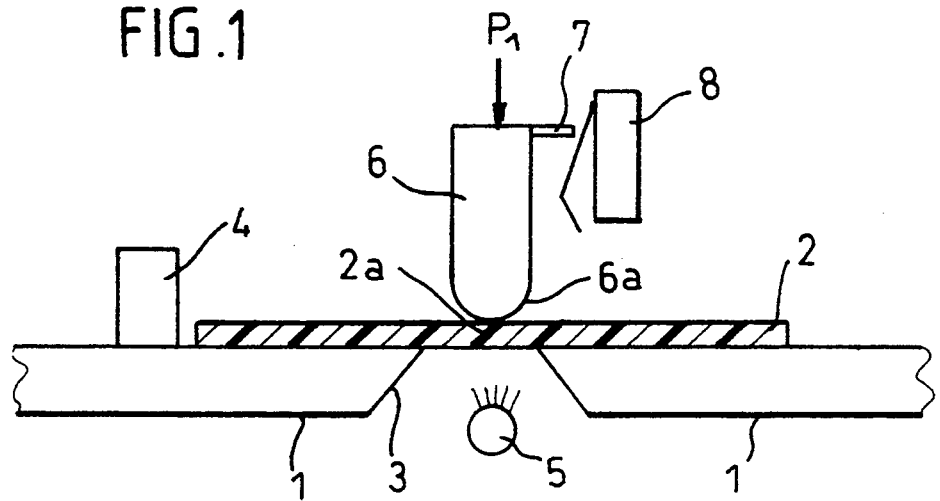
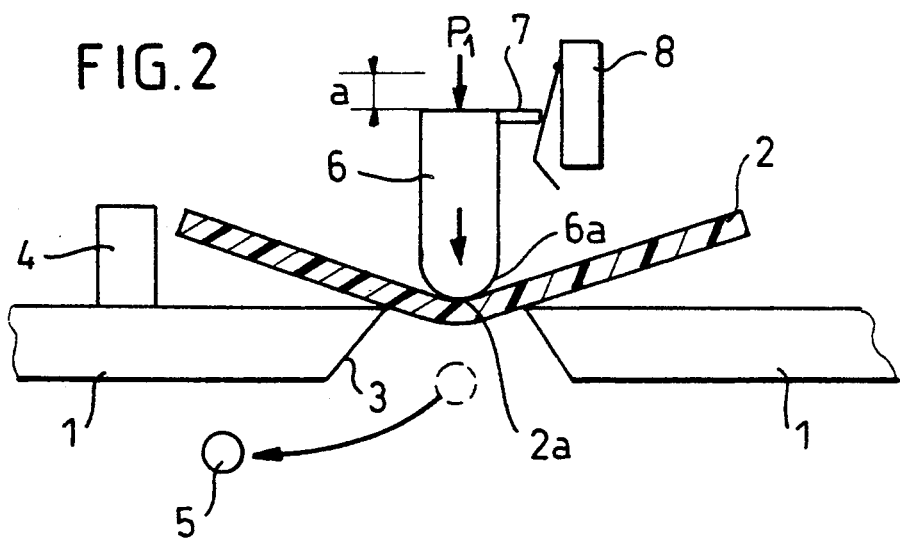
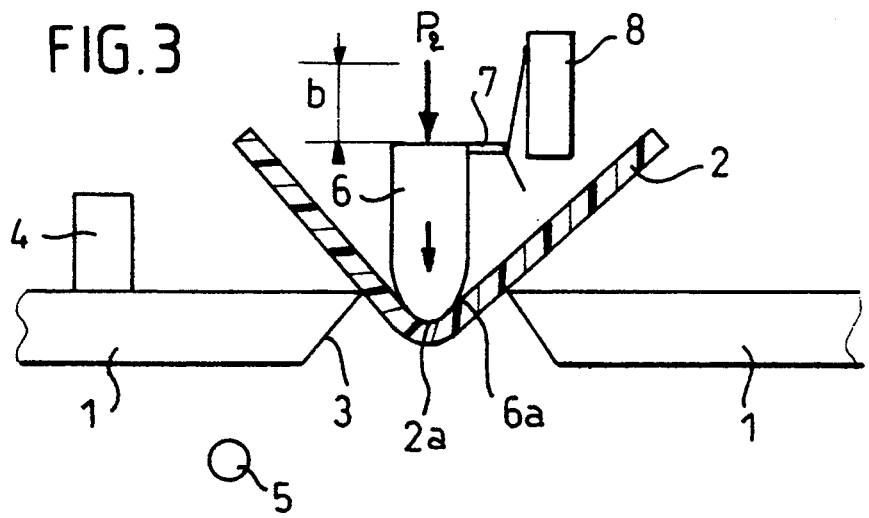

METHOD FOR THE HOT DEFORMATION OF A WORK PIECE

BACKGROUND OF THE INVENTION

The present invention relates to the hot deformation of a work piece, in particular by folding, so that this piece has a final shape different from the initial shape. More particularly, the invention is applicable to such deformation of work pieces of plastics material.

In this technical field, difficulties have been encountered as concerns repeatability and regularity in the obtainment of identical pieces, in particular as concerns the amplitude of the deformation, for example the folding angles, and the final appearance of the material in the deformed zone, this appearance depending not only on the degree of deformation of the material but also on the temperature to which the latter is brought. At the present time, to effect a hot deformation of a work piece, in particular a piece of plastics material, the material is heated in the zone to be deformed, and the characteristics of this heating, i.e. its duration, the temperature of the source of heat, the intended temperature of the material in its deformation zone, the precision of the heat flow, and other parameters, are controlled and monitored in such manner that, finally, the piece is heated for a predetermined period of time, after which, possibly after having removed the source of heat, the piece is mechanically deformed with a suitable tool.

However, it has been found that this calculated predetermined duration of the heating must be modified in accordance with the ambient temperature; this is why there are associated with the known installations thermal sensors which detect the variations in the ambient temperature and correct, possibly automatically, this heating duration by shortening or lengthening it.

Notwithstanding this precaution, the presently-known method for the thermal deformation of a work piece, in particular a piece of plastics material, presents serious drawbacks which are related to the fact that the unmeasured variations of certain parameters are not taken into account, for example the initial temperature of the work piece to be deformed, the temperature of certain mechanical elements cooperating with the work piece, for example the support or the guides for the work piece, or the deforming tool, and the stability of the source of heat.

Consequently, even if the predetermined heating duration is conformed to, it often occurs that, in the course of the piece deforming stage proper, the zone to be deformed is not at the required temperature, either because the temperature is too low, which is liable to result in mechanical degradation or fracture of the work piece, or because the temperature is too high, which has for consequence for example thermal degradation by modification of the structure of the work piece.

Another method (British patent 898 095) comprises first of all forcefully deforming the work piece, optionally after a preheating, so as to impart the desired final shape thereto, then subjecting the piece, in this deformed state, to a heating so that the initial deformation is maintained. However, in this method, on one hand, the deformation zone of the piece is subjected to large mechanical stresses which are liable to cause its degradation and even its fracture and, on the other hand, the operational conditions of the heat treatment are just as uncertain as in the first aforementioned method.

SUMMARY OF THE INVENTION

An object of the invention is to overcome these drawbacks and to permit the hot deformation of a work piece, principally a piece of plastics material, by taking into account the fact that, in relation to the mechanical action to which it is subjected, it is the effective temperature of the zone of the piece to be deformed which constitutes the principal operational condition, irrespective of possible variations in the other operational conditions.

The present invention therefore provides a method comprising exerting on the work piece, in the zone to be deformed, a controlled deforming pressure and, during at least an initial stage of the application of said pressure, heating the work piece in a controlled manner, at least in the zone to be deformed, whereby, under the combined effect of the pressure and the heat, the work piece is deformed into its desired final state when it has reached a temperature in relation to the mechanical deformation stress to which it is subjected.

Thus, according to the invention, there is only taken into account the effective temperature of the work piece in the zone to be deformed, with no consideration of any of the exterior parameters which might affect this temperature, for achieving the deformation of the work piece under the mechanical effect of the exerted pressure.

In a preferred manner of carrying out the invention, the work piece is heated only during an initial stage of the application of the pressure until the work piece is deformed by a predetermined amount which is detected, after which the heating is stopped. This stopping of the heating may be necessary to avoid an overheating of the work piece during the remainder of the deformation and/or to withdraw the heating means from the path of the work piece when the latter deforms.

Throughout the method, the pressure applied may be either substantially constant or variable, the value of the pressure after the start of the deformation being higher or lower than the value before this start of the deformation.

According to a preferred manner of carrying out the method of the invention, the work piece is heated on one side and the deforming pressure is applied to the other side. However, the work piece may also be heated on both sides.

The method defined hereinbefore is applicable to a work piece which is initially at the ambient temperature or has been preheated.

If the heating is stopped before the end of the deformation, this has substantially no effect on the temperature of the piece in the zone to be deformed, owing to the fact that the end of the final deformation generally occurs very rapidly.

The invention also provides a device for carrying out the method defined hereinbefore, this device being characterized in that it comprises: a support for the work piece to be deformed; means for applying a pressure on said work piece in the zone to be deformed; and means for heating the work piece in the zone to be deformed at least during an initial stage of the application of said pressure.

Preferably, means are also included in this device for detecting the start of the deformation of the work piece and stopping the heating when the start of the deformation is detected.

The work piece may be deformed by means of a support element which is in contact with the work piece and on which the pressure is exerted.

The invention will be understood from the following description of a preferred non-limitative embodiment of a device for carrying out the method, with reference to the accompanying drawing which is part of the disclosure.

BRIEF DESCRIPTION OF THE DRAWINGS

FIG. 1 is a vertical elevational view, partly in section, of a device for the hot folding of a work piece of plastics material, in the initial stage of the method in which the work piece is heated;

FIG. 2 is a view similar to FIG. 1 of the work piece which has been deformed to a predetermined degree by the combined effect of the heat and the primary pressure, and FIG. 3 is a view similar to FIGS. 1 and 2 of the work piece which has been completely deformed.

DETAILED DESCRIPTION OF THE PREFERRED EMBODIMENT

The following description will be made with reference to the deformation by folding of a planar work piece of plastics material; however, this is only an example of the application of the invention which is not intended to be limitative, it being understood that the deformation may be other than by folding, for example by bending or corrugation, and the work piece may have another initial shape or be composed of another material.

In the embodiment given by way of illustration, the device comprises a table I for supporting on its top side a plate 2 of plastics material which freely rests on the table. In the folding zone, the table 1 defines a slot 3 in which, as shown in FIGS. 2 and 3, the folded edge of the plate becomes positioned. The device also comprises other static mechanical elements diagrammatically shown by the reference character 4, for example stops, guides or means for feeding plates 2 in succession.

To carry out the method according to the invention, the work piece 2, in its zone 2a to be deformed, is initially and simultaneously subjected to a heating and a first pressure, P1, applied in the direction to achieve the desired final deformation. The heating is achieved in any suitable manner by at least one heating element 5, this heating being for example of the electrical type or achieved by directing a stream of hot air onto the work piece. Advantageously, the heating element 5 is located in the slot 3 at a suitable distance from the work piece 2 on the side of the surface of the latter which, upon complete deformation, will undergo the greatest elongation. As concerns the pressure P1, it is exerted by means of a thrust element or tool 6 which is in contact with the other surface of the work piece 2 and has an active lower end portion 6a of such shape that, at the end of the deformation (see FIG. 3), it has a large area of contact with the work piece 2. The pressure P1 exerted by the element 6 on the work piece 2 is produced in a precise and constant manner by any suitable system (not shown), for example a hydraulic, mechanical or pneumatic system whose characteristics of quantitative stability are indisputable.

Thus, in the course of the first operational stage of the method according to the invention, the work piece 2 is subjected to the combined effect of the heating by the element 5 and the pressure P1 applied by the element 6, to obtain the desired final deformation.

Advantageously, the start or initiation of the deformation of the work piece 2 due to the aforementioned combined effect is detected and the complete deformation of the work piece, of larger extent, is accomplished without heating.

Detecting means for detecting the start of the deformation are shown diagrammatically in the drawing. In the presently-described embodiment, the thrust element 6 carries a projecting pin 7 which, upon vertical displacement of the element 6, comes to cooperate with a microswitch 8 so as to change the state of the latter when the element 6 has moved a predetermined distance a corresponding to the chosen start of the deformation of the work piece 2. FIG. 2 illustrates the instant of the method according to the invention at which this deformation value is reached. At this instant, the microswitch 8 changes its state and the heating element 5 is withdrawn and possibly rendered inoperative.

The thrust element 6 is subjected to a pressure P2 to completely deform the work piece 2 and impart thereto the final shape, as shown in FIG. 3. At the end of the method, the thrust element 6 has shifted vertically through a distance b relative to its initial position shown in FIG. 1, and the work piece 2 has reached its final shape. In the known manner, as the case may be, the thrust element 6 may remain in its position shown in FIG. 3 until a suitable cooling of the work piece 2, or may be raised immediately after it has reached the end of its downward travel. The end-of-travel position of the thrust element 6 is defined for example by a stop (not shown).

In the foregoing example of the manner of carrying out the method and the embodiment of the device according to the invention, the heating and the pressure are applied simultaneously. However, it is possible to effect a preheating of the work piece to be deformed. Further, the pressure P2 is generally equal to the pressure P1. However, it is not excluded that these two pressures may be different, the pressure P2 being then higher or lower than the pressure P1.

The pressure exerted on the work piece and the temperature to which the latter is brought in its deformation zone depend on several parameters and are determined case by case in particular with the nature of the work piece, its initial geometrical characteristics, and the type and amplitude of the deformation to be effected.

As concerns plastics materials which constitute the preferred but non-limitative application of the invention, the temperatures of the work piece in its deformation zone may range from 50° C. to 300° C. and the pressure applied may range from 0.2 bar to 6 bars.

In a practical example of a mode of carrying out the invention, there was used a plate of high-impact polystyrene having a length of 700 mm, a folding groove was provided on its inner surface and the work piece was folded at 90°. The plate was heated in the folding zone to a temperature of about 100° C. and a pressure of 3 bars was applied on the deforming tool which travelled vertically downwardly, this tool weighing about 15 kg.

It is clear from the foregoing description of the example of the method and device according to the invention, that parameters which are difficult to control are completely ignored and only the principal parameter of the deformation of the work piece is considered, namely its capacity to deform without degradation in a repeatable and precise manner when it has reached a temperature which, in relation to the pressure applied and without being predetermined or calculated, imparts to the material to be deformed sufficient plasticity to ensure that it deforms in a suitable manner under a given pressure.

Thus, with the invention, there is an excellent stability of the characteristics of the work pieces in a given series, it is possible to change from one material to another or one thickness to another without changing the settings, the work piece is heated and deformed into its final shape with no need to displace it, the cost of the control systems is greatly reduced and the aforementioned method can be easily adapted to existing machines.

What is claimed is:

1. A method for hot deformation of a work piece comprising: exerting on one side of said work piece, in a zone of said work piece to be deformed, a controlled deforming first positive pressure, P1, while simultaneously heating in a controlled manner an opposite side of said work piece, at least in said zone to be deformed, until said work piece reaches a temperature such that said work piece has sufficient plasticity to deform under said first positive pressure and start of deformation of said work piece occurs; stopping said heating upon said start of deformation; and then subjecting the work piece to a controlled second positive pressure, P2, on said one side of said work piece and in said zone to be deformed until said work piece is deformed into a desired final state.

2. A method according to claim 1, wherein said hot deformation is a hot folding of said work piece.

3. A method according to claim 1, wherein said work piece is made of plastics material.

4. A method according to claim 1, comprising stopping said heating by withdrawing a heating element from at least said zone of said work piece to be deformed.

5. A method according to claim 1, wherein said first and second positive pressures are substantially constant and equal.

6. A method according to claim 1, wherein said second positive pressure is higher than said first positive pressure.

7. A method according to claim 1, wherein said second positive pressure is lower than said first positive pressure.

8. A method according to claim 1, comprising subjecting said work piece to a preheating before said exertion of said first positive pressure.

9. A method for hot-deforming a work piece, comprising the steps of: applying a controlled constant first deforming pressure, P1, to one face of the work piece in a zone to be deformed while simultaneously heating another face of the work piece in said zone to a temperature such that the work piece has sufficient plasticity to deform under said first deforming pressure; maintaining said first deforming pressure and said heating until start of deformation of the work piece under the combined effects of pressure and heat; stopping said heating upon said start of deformation; then applying a second deforming pressure, P2, to said one face of the work piece in said zone to be deformed; and maintaining said second deforming pressure until the work piece has been deformed to a desired shape.

10. A method according to claim 9, wherein said hot deforming is a hot folding of said work piece.

11. A method according to claim 9, wherein said work piece is made of plastics material.

12. A method according to claim 9, comprising the step of stopping said heating by removing a heating element from said zone of said work piece to be deformed.

13. A method according to claim 9, comprising the step of detecting the beginning of the work piece deformation to control the application of said second pressure and to stop said heat application.

14. A method according to claim 9, wherein said first and second pressures are equal.

15. A method according to claim 9, wherein said first and second pressures are different.

16. A method according to claim 9, comprising the step of subjecting said work piece to a preheating before the application of said first pressure.

* * * * *